US011867221B2

(12) United States Patent
Oh et al.

(10) Patent No.: US 11,867,221 B2
(45) Date of Patent: Jan. 9, 2024

(54) STUD

(71) Applicant: SAMSUNG ELECTRONICS CO., LTD., Suwon-si (KR)

(72) Inventors: Pil Yong Oh, Suwon-si (KR); Jae Uk Kwak, Suwon-si (KR); Jeong Ryeol Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 337 days.

(21) Appl. No.: 17/299,394

(22) PCT Filed: Oct. 28, 2019

(86) PCT No.: PCT/KR2019/014299
§ 371 (c)(1),
(2) Date: Jun. 3, 2021

(87) PCT Pub. No.: WO2020/138682
PCT Pub. Date: Jul. 2, 2020

(65) Prior Publication Data
US 2022/0049737 A1    Feb. 17, 2022

(30) Foreign Application Priority Data

Dec. 27, 2018  (KR) .......................... 10-2018-0170253

(51) Int. Cl.
*F16B 39/282*  (2006.01)
*F16B 37/04*   (2006.01)

(52) U.S. Cl.
CPC .......... *F16B 39/282* (2013.01); *F16B 37/048* (2013.01)

(58) Field of Classification Search
CPC ........ F16B 5/0208; F16B 23/00; F16B 37/00; F16B 37/04; F16B 37/044; F16B 37/048; F16B 39/282; F16B 41/002

(Continued)

(56) References Cited

U.S. PATENT DOCUMENTS 327,612 A * 10/1885 Stark ..................... F16B 37/041
411/178
2,453,235 A * 11/1948 Krieger .................. H01H 73/24
74/2

(Continued)

FOREIGN PATENT DOCUMENTS

JP       2015-121234 A    7/2015
JP          3200554 U    10/2015

(Continued)

OTHER PUBLICATIONS

International Search Report dated Mar. 2, 2020, in corresponding International Patent Application No. PCT/KR2019/014299.

*Primary Examiner* — Roberta S Delisle
(74) *Attorney, Agent, or Firm* — STAAS & HALSEY LLP

(57) ABSTRACT

The present disclosure relates to a stud improved to prevent loosening of the stud press-fitted into a sheet metal by increasing a resistance force against a torque.
The stud includes a body provided to be inserted into a stud mounting hole formed on the sheet metal and formed with a screw thread to which a screw is fastened therein, a flange provided on one side of the body to have a larger diameter than the stud mounting hole and press-fitted into the sheet metal, and a rotation preventer protruding from the flange to have a diameter larger than the stud mounting hole and smaller than the flange and press-fitted into the sheet metal to prevent rotation of the stud, wherein the rotation preventer includes a plurality of rotation preventing protrusions having asymmetric shapes, and each of the plurality of rotation preventing protrusions includes a rotation preventing surface provided to be perpendicular to a tangent line of a circle connecting ends of the plurality of rotation preventing protrusions.

7 Claims, 6 Drawing Sheets

(58) Field of Classification Search
USPC .................................. 411/103, 108, 427, 436
See application file for complete search history.

(56) References Cited

U.S. PATENT DOCUMENTS

| | | | | |
|---|---|---|---|---|
| 4,068,697 | A * | 1/1978 | Schiaffino | F16B 39/36 |
| | | | | 411/266 |
| 5,190,423 | A * | 3/1993 | Ewing | F16B 39/282 |
| | | | | 411/533 |
| 8,328,491 | B2 * | 12/2012 | Bucknell | B25B 29/02 |
| | | | | 411/432 |
| 8,888,429 | B2 | 11/2014 | Pamer et al. | |
| 2007/0297870 | A1 | 12/2007 | Vrana et al. | |
| 2010/0290865 | A1 * | 11/2010 | Schraer | F16B 39/282 |
| | | | | 411/395 |
| 2011/0038685 | A1 * | 2/2011 | Christ | F16B 37/048 |
| | | | | 411/103 |
| 2012/0028070 | A1 * | 2/2012 | Babej | F16B 37/062 |
| | | | | 428/596 |
| 2012/0219377 | A1 * | 8/2012 | Pamer | F16B 39/282 |
| | | | | 411/188 |
| 2013/0189051 | A1 * | 7/2013 | Diehl | F16B 19/086 |
| | | | | 411/501 |
| 2013/0302107 | A1 * | 11/2013 | Burton | F16B 39/282 |
| | | | | 411/166 |
| 2017/0227044 | A1 | 8/2017 | Ulrich et al. | |

FOREIGN PATENT DOCUMENTS

| | | |
|---|---|---|
| JP | 6025579 B2 | 11/2016 |
| KR | 20-1999-0030546 U | 7/1999 |
| KR | 10-1570433 B1 | 11/2015 |

\* cited by examiner

STUD

CROSS-REFERENCE TO RELATED APPLICATIONS

This application is a U.S. National Stage Application which claims the benefit under 35 U.S.C. § 371 of International Patent Application No. PCT/KR2019/014299 filed on Oct. 28, 2019, which claims foreign priority benefit under 35 U.S.C. § 119 of Korean Patent Application 10-2018-0170253 filed on Dec. 27, 2018, in the Korean Intellectual Property Office, the contents of both of which are incorporated herein by reference.

TECHNICAL FIELD

The present disclosure relates to a stud having a high resistance force against a torque.

BACKGROUND ART

Generally, a stud is a part used to screw a component to a sheet metal.

In the case of TV, studs are used to connect PCBs, separate brackets, a stand, a wall mount, and the like.

A stud includes a body on which a screw thread is formed to which a screw is fastened, and a flange press-fitted into a sheet metal.

While a component is fastened by a screw to the stud press-fitted into the sheet metal, in a process of fastening the component by the screw, a phenomenon in which the stud is loosened from the sheet metal may occur due to a torque applied to the stud.

In order to prevent the stud from being loosened from the sheet metal, the flange is formed with a rotation preventing portion having a resistance force against a torque applied to the stud.

However, in a case in which a torque receiving angle of the rotation preventing portion is small when a torque is applied to the stud, a resistance force against the torque is weak, so that the stud may be loosened from the sheet metal.

DISCLOSURE

Technical Problem

The present disclosure is directed to providing a stud improved to prevent loosening of the stud press-fitted into a sheet metal by increasing a resistance force against a torque.

Technical Solution

An aspect of the present disclosure provides a stud, which is press-fitted into a sheet metal to fasten a component to the sheet metal with a screw, including a body provided to be inserted into a stud mounting hole formed on the sheet metal and formed with a screw thread to which the screw is fastened therein, a flange provided on one side of the body to have a larger diameter than the stud mounting hole and press-fitted into the sheet metal, and a rotation preventer protruding from the flange to have a diameter larger than the stud mounting hole and smaller than the flange and press-fitted into the sheet metal to prevent rotation of the stud, wherein the rotation preventer includes a plurality of rotation preventing protrusions having asymmetric shapes, and each of the plurality of rotation preventing protrusions includes a rotation preventing surface provided to be perpendicular to a tangent line of a circle connecting ends of the plurality of rotation preventing protrusions.

The body may have a tapered shape in which a diameter gradually decreases in a direction away from the flange.

The rotation preventer may protrude from the flange toward the body.

The rotation preventer may be provided such that when the stud is press-fitted into the sheet metal, a portion of the sheet metal coming into contact with the rotation preventer is dented.

The rotation preventer may be provided to increase a resistance force against a torque so that the stud is prevented from being loosened from the sheet metal by the torque.

The flange may be provided to have a hexagonal shape.

The flange may be provided to have a circular shape.

Advantageous Effects

According to embodiments of the present disclosure, a resistance force of a stud against a torque is increased, so that the stud press-fitted into a sheet metal can be prevented from being loosened.

MODE FOR INVENTION

Figure 1:
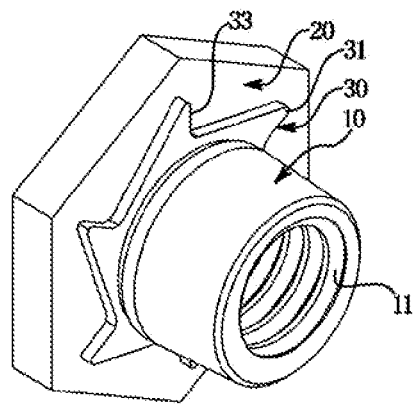
FIG. 1 is a perspective view of a stud according to an embodiment of the present disclosure.

The embodiments described in the present specification and the configurations shown in the drawings are only examples of preferred embodiments of the present disclosure, and various modifications may be made at the time of filing of the present disclosure to replace the embodiments and drawings of the present specification.

Like reference numbers or signs in the various drawings of the application represent parts or components that perform substantially the same functions.

The terms used herein are for the purpose of describing the embodiments and are not intended to restrict and/or to limit the present disclosure. For example, the singular expressions herein may include plural expressions, unless the context dearly dictates otherwise. Also, the terms "comprises" and has are intended to indicate that there are features, numbers, steps, operations, elements, parts, or combinations thereof described in the specification, and do not exclude the presence or addition of one or more other features, numbers, steps, operations, elements, parts, or combinations thereof.

It will be understood that, although the terms first, second, etc. may be used herein to describe various components, these components should not be limited by these terms. These terms are only used to distinguish one component from another. For example, without departing from the scope of the present disclosure, the first component may be referred to as a second component, and similarly, the second component may also be referred to as a first component. The term "and/or" includes any combination of a plurality of related items or any one of a plurality of related items.

In this specification, the terms "front side," "rear side," "upper portion," "lower portion," "upper end," "lower end," "left side," and "right side" used in the following description are defined with reference to the drawings, and the shape and position of each component are not limited by these terms.

Hereinafter, embodiments of the present disclosure will be described in detail with reference to the accompanying drawings.

Figure 2:
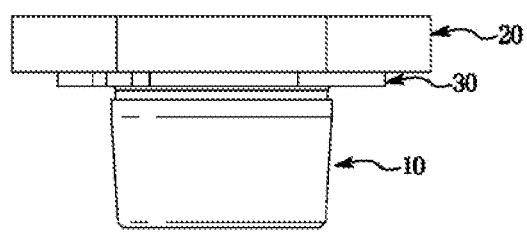
FIG. 2 is a view illustrating one side of the stud according to an embodiment of the present disclosure.
Figure 3:
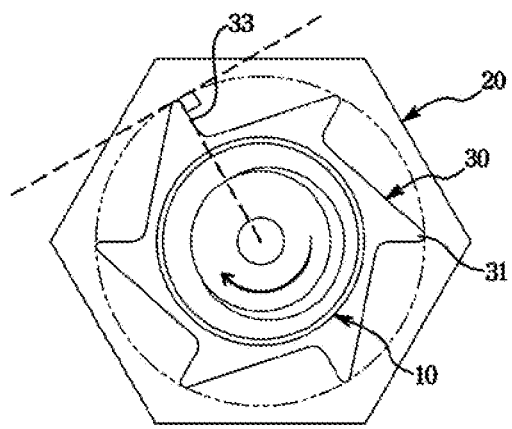
FIG. 3 is a plan view illustrating a rotation preventer of the stud according to an embodiment of the present disclosure.
Figure 4:
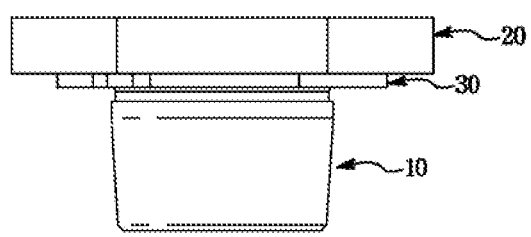
FIG. 4 is a view illustrating a state before the stud according to an embodiment of the present disclosure is press-fitted into a sheet metal.
Figure 4:
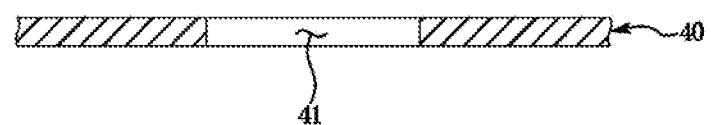
Figure 5:
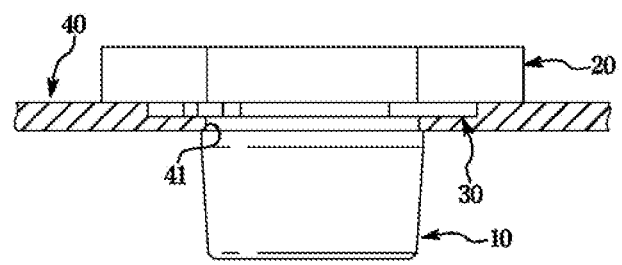
FIG. 5 is a view illustrating a state after the stud according to an embodiment of the present disclosure is press-fitted into the sheet metal.

FIG. 1 is a perspective view of a stud according to an embodiment of the present disclosure, FIG. 2 is a view illustrating one side of the stud according to an embodiment of the present disclosure, FIG. 3 is a plan view illustrating a rotation preventer of the stud according to an embodiment of the present disclosure, FIG. 4 is a view illustrating a state before the stud according to an embodiment of the present disclosure is press-fitted into a sheet metal, and FIG. 5 is a view illustrating a state after the stud according to an embodiment of the present disclosure is press-fitted into the sheet metal.

As illustrated in FIGS. 1 to 5, a stud is a part press-fitted into a sheet metal 40 in order to fasten a component (not shown) to the sheet metal 40 with a screw (not shown).

The stud may include a body 10 provided to be inserted into a stud mounting hole 41 formed on the sheet metal 40 and formed with a screw thread 11 to which a screw (not shown) is fastened therein, a flange 20 provided on one side of the body 10 to have a larger diameter than the stud mounting hole 41, and a rotation preventer 30 provided to protrude from the flange 20 to prevent rotation of the stud.

The body 10 may be inserted into the stud mounting hole 41 formed on the sheet metal 40 when the stud is press-fitted into the sheet metal 40.

The body 10 may have a diameter smaller than or equal to the stud mounting hole 41 so that the stud may be inserted into the stud mounting hole 41.

While the stud mounting hole 41 formed on the sheet metal 40 and the body 10 of the stud are formed in accordance with a predetermined standard, in the case of the stud mounting hole 41 formed on the sheet metal 40, a tolerance may occur due to a work process or the like.

The body 10 of the stud is manufactured according to a predetermined standard, and when a large tolerance occurs with respect to a size of the stud mounting hole 40, the body 10 may not be properly inserted into the stud mounting hole 40.

Accordingly, the body 10 may be provided to have a tapered shape so that the body 10 of the stud may be inserted into the stud mounting hole 41 even when a tolerance occurs to some extent with respect to the size of the stud mounting hole 41.

Specifically, the body 10 of the stud may be provided to have a tapered shape in which a diameter gradually decreases in a direction away from the flange 20.

Inside the body 10, the screw thread 11 to which a screw is fastened when a component is screwed to the sheet metal 40 may be formed.

The flange 20 may be provided on one side of the body 10 to have a hexagonal shape.

The flange 20 may be provided to have a diameter larger than a diameter of the stud mounting hole 41 so as not to be inserted into the stud mounting hole 41 formed on the sheet metal 40 when the stud is press-fitted into the sheet metal 40.

Accordingly, the flange 20 may be press-fitted into the sheet metal 40 by coming into contact with the sheet metal 40 when the stud is inserted into the stud mounting hole 41.

The rotation preventer 30 is provided to protrude from the flange 20 so that when the stud is press-fitted into the sheet metal 40, the rotation preventer may be press-fitted into the sheet metal 40 together with the flange 20.

The rotation preventer 30 may protrude from the flange 20 toward the body 10.

It may be appropriate that the rotation preventer 30 has a thinner thickness than the flange 20.

The rotation preventer 30 may be provided to have a diameter larger than the stud mounting hole 41 and smaller than the flange 20 so that the rotation preventer is not inserted into the stud mounting hole 41 when the stud is press-fitted into the sheet metal 40.

The rotation preventer 30 may include a plurality of rotation preventing protrusions 31 having asymmetric shapes.

Each of the plurality of rotation preventing protrusions 31 may include a rotation preventing surface 33 provided to increase a resistance force against a torque applied to the stud so that the stud is prevented from being loosened from the sheet metal 40 by the torque.

A component is fastened to the stud press-fitted into the sheet metal 40 by a screw, and a torque may be applied to the stud in a process of fastening the component by the screw.

The rotation preventing surface 33 may be a surface to prevent the stud from being loosened from the sheet metal 40 by generating a resistance force against a torque applied to the stud when the torque is applied to the stud.

The rotation preventing surface 33 may be provided to be perpendicular to a tangent line of a virtual circle connecting ends of the plurality of rotation preventing protrusions 31.

An angle between the tangent line of the virtual circle connecting the ends of the plurality of rotation preventing protrusions 31 and the rotation preventing surface 33 will be referred to as a receiving angle.

Because the larger a receiving angle is in an angle of 90 degrees or less, the greater a resistance force against a torque applied to the stoke, it may be appropriate that a receiving angle of the rotation preventing surface 33 is provided at 90 degrees.

When the stud is press-fitted into the sheet metal 40, the rotation preventer 30 may be press-fitted into the sheet metal 40 while denting a portion of the sheet metal 40 coming into contact with the rotation preventer 30.

Because the rotation preventer 30 is press-fitted while denting the sheet metal 40, the rotation preventer 30 may prevent the stud from being loosened from the sheet metal 40 by generating a resistance force against the torque applied to the stud toward the sheet metal 40.

Figure 6:
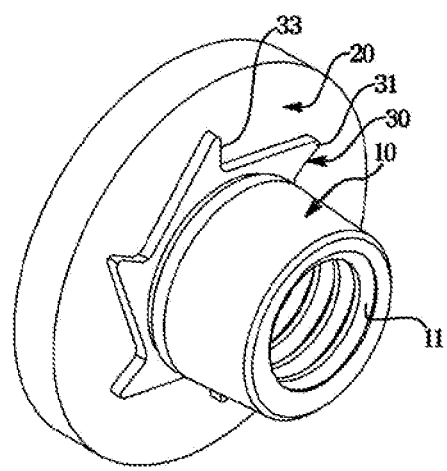
FIG. 6 is a perspective view of the stud provided such that a flange according to another embodiment of the present disclosure has a circular shape.

FIG. 6 is a perspective view of the stud provided such that a flange according to another embodiment of the present disclosure has a circular shape.

As illustrated in FIG. 6, the flange 20 of the stud may be provided to have a circular shape.

The drawing illustrates that the flange 20 of the stud has a hexagonal shape or a circular shape, but the present disclosure is not limited thereto.

Figure 7:
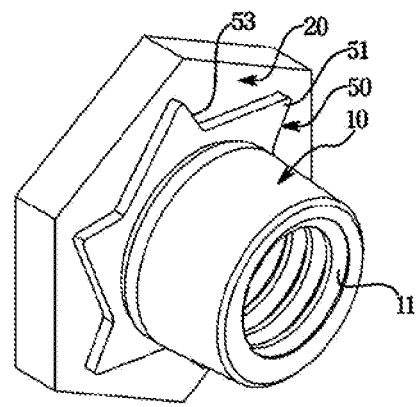
FIG. 7 is a perspective view of a stud according to another embodiment of the present disclosure.
Figure 8:
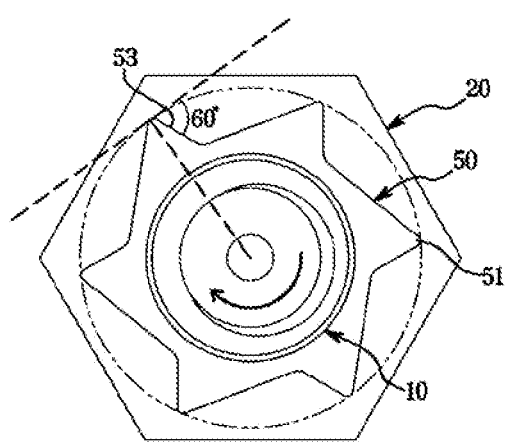
FIG. 8 is a plan view illustrating a rotation preventer of the stud according to another embodiment of the present disclosure.

FIG. 7 is a perspective view of a stud according to another embodiment of the present disclosure, and FIG. 8 is a plan view illustrating a rotation preventer of the stud according to another embodiment of the present disclosure.

As illustrated in FIGS. 7 and 8, a stud may include a body 10 formed with the screw thread 11 to which a screw (not shown) is fastened therein, the flange 20 provided on one side of the body 10, and a rotation preventer 50 provided to protrude from the flange 20 to prevent rotation of the stud.

Because the configurations other than a configuration of the rotation preventer 50 are the same as those of the stud illustrated in FIGS. 1 to 5, only the configuration of the rotation preventer 50 will be described with reference to FIGS. 1 to 5.

The rotation preventer 50 is provided to protrude from the flange 20 so that when the stud is press-fitted into the sheet metal 40, the rotation preventer may be press-fitted into the sheet metal 40 together with the flange 20.

The rotation preventer 50 may protrude from the flange 20 toward the body 10.

It may be appropriate that the rotation preventer 50 has a thinner thickness than the flange 20.

The rotation preventer 50 may be provided to have a diameter larger than the stud mounting hole 41 and smaller than the flange 20 so that the rotation preventer is not inserted into the stud mounting hole 41 when the stud is press-fitted into the sheet metal 40.

The rotation preventer 50 may include a plurality of rotation preventing protrusions 51 having asymmetric shapes.

Each of the plurality of rotation preventing protrusions 51 may include a rotation preventing surface 53 provided to increase a resistance force against a torque applied to the stud so that the stud is prevented from being loosened from the sheet metal 40 by the torque.

A component is fastened to the stud press-fitted into the sheet metal 40 by a screw, and a torque may be applied to the stud in a process of fastening the component by the screw.

The rotation preventing surface 53 may be a surface to prevent the stud from being loosened from the sheet metal 40 by generating a resistance force against a torque applied to the stud when the torque is applied to the stud.

A receiving angle of the rotation preventing surface 53 may be provided at 60 degrees.

When the stud is press-fitted into the sheet metal 40, the rotation preventer 50 may be press-fitted into the sheet metal 40 while denting a portion of the sheet metal 40 coming into contact with the rotation preventer 50.

Because the rotation preventer 50 is press-fitted while denting the sheet metal 40, the rotation preventer 50 may prevent the stud from being loosened from the sheet metal 40 by generating a resistance force against the torque applied to the stud toward the sheet metal 40.

Figure 9:
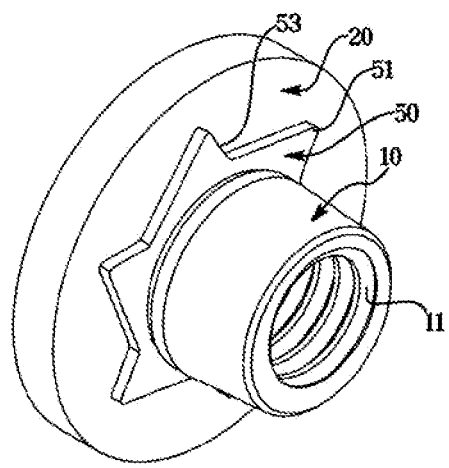
FIG. 9 is a perspective view of the stud provided such that a flange according to another embodiment of the present disclosure has a circular shape.

FIG. 9 is a perspective view of the stud provided such that a flange according to another embodiment of the present disclosure has a circular shape.

As illustrated in FIG. 9, the flange 20 of the stud may be provided to have a circular shape.

The drawing illustrates that the flange 20 of the stud has a hexagonal shape or a circular shape, but the present disclosure is not limited thereto.

Figure 10:
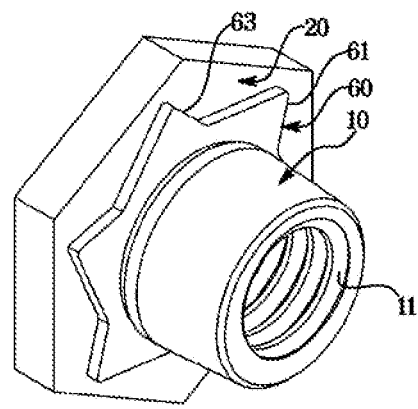
FIG. 10 is a perspective view of a stud according to another embodiment of the present disclosure.
Figure 11:
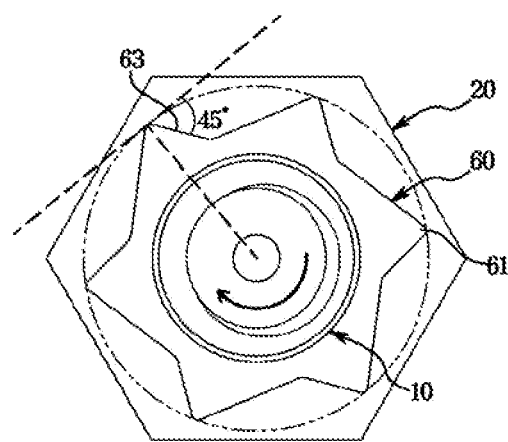
FIG. 11 is a plan view illustrating a rotation preventer of the stud according to another embodiment of the present disclosure.

FIG. 10 is a perspective view of a stud according to another embodiment of the present disclosure, and FIG. 11 is a plan view illustrating a rotation preventer of the stud according to another embodiment of the present disclosure.

As illustrated in FIGS. 10 and 11, a stud may include a body 10 formed with the screw thread 11 to which a screw (not shown) is fastened therein, the flange 20 provided on one side of the body 10, and a rotation preventer 60 provided to protrude from the flange 20 to prevent rotation of the stud.

Because the configurations other than a configuration of the rotation preventer 60 are the same as those of the stud illustrated in FIGS. 1 to 5, only the configuration of the rotation preventer 60 will be described with reference to FIGS. 1 to 5.

The rotation preventer 60 is provided to protrude from the flange 20 so that when the stud is press-fitted into the sheet metal 40, the rotation preventer may be press-fitted into the sheet metal 40 together with the flange 20.

The rotation preventer 60 may protrude from the flange 20 toward the body 10.

It may be appropriate that the rotation preventer 60 has a thinner thickness than the flange 20.

The rotation preventer 60 may be provided to have a diameter larger than the stud mounting hole 41 and smaller than the flange 20 so that the rotation preventer is not inserted into the stud mounting hole 41 when the stud is press-fitted into the sheet metal 40.

The rotation preventer 60 may include a plurality of rotation preventing protrusions 61 having asymmetric shapes.

Each of the plurality of rotation preventing protrusions 61 may include a rotation preventing surface 63 provided to increase a resistance force against a torque applied to the stud so that the stud is prevented from being loosened from the sheet metal 40 by the torque.

A component is fastened to the stud press-fitted into the sheet metal 40 by a screw, and a torque may be applied to the stud in a process of fastening the component by the screw.

The rotation preventing surface 63 may be a surface to prevent the stud from being loosened from the sheet metal 40 by generating a resistance force against a torque applied to the stud when the torque is applied to the stud.

A receiving angle of the rotation preventing surface 63 may be provided at 45 degrees.

When the stud is press-fitted into the sheet metal 40, the rotation preventer 60 may be press-fitted into the sheet metal 40 while denting a portion of the sheet metal 40 coming into contact with the rotation preventer 60.

Because the rotation preventer 60 is press-fitted while denting the sheet metal 40, the rotation preventer 60 may prevent the stud from being loosened from the sheet metal 40 by generating a resistance force against the torque applied to the stud toward the sheet metal 40.

Figure 12:
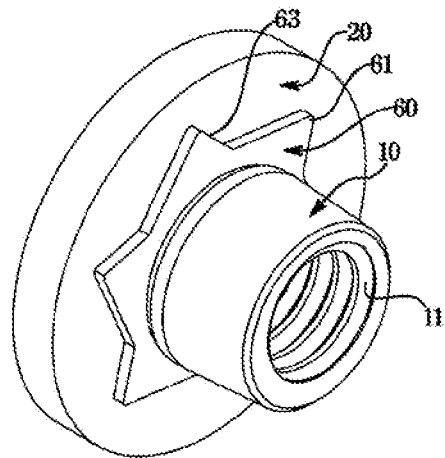
FIG. 12 is a perspective view of the stud provided such that a flange according to another embodiment of the present disclosure has a circular shape.

FIG. 12 is a perspective view of the stud provided such that a flange according to another embodiment of the present disclosure has a circular shape.

As illustrated in FIG. 12, the flange 20 of the stud may be provided to have a circular shape.

The drawing illustrates that the flange 20 of the stud has a hexagonal shape or a circular shape, but the present disclosure is not limited thereto.

While the present disclosure has been particularly described with reference to exemplary embodiments, it should be understood by those of skilled in the art that various changes in form and details may be made without departing from the spirit and scope of the present disclosure.

The invention claimed is:

1. A stud, which is press-fitted into a sheet metal to fasten a component to the sheet metal with a screw, comprising:
   a body provided to be inserted into a stud mounting hole formed on the sheet metal and formed with a screw thread to which the screw is fastened therein;
   a flange provided on one side of the body to have a larger diameter than the stud mounting hole and press-fitted into the sheet metal; and
   a rotation preventer protruding from the flange to have a diameter larger than the stud mounting hole and smaller than the flange and press-fitted into the sheet metal to prevent rotation of the stud,
   wherein the rotation preventer comprises a plurality of rotation preventing protrusions having asymmetric shapes, and each of the plurality of rotation preventing protrusions comprises a rotation preventing surface extending from an end of each the plurality of rotation preventing protrusions toward a center of a circle connecting ends of the plurality of rotation preventing protrusions.

2. The stud according to claim 1, wherein the body has a tapered shape in which a diameter gradually decreases in a direction away from the flange.

3. The stud according to claim 1, wherein the rotation preventer protrudes from the flange toward the body.

4. The stud according to claim 1, wherein the rotation preventer is provided such that when the stud is press-fitted into the sheet metal, a portion of the sheet metal coming into contact with the rotation preventer is dented.

5. The stud according to claim 1, wherein the rotation preventer is provided to increase a resistance force against a torque so that the stud is prevented from being loosened from the sheet metal by the torque.

6. The stud according to claim 1, wherein the flange is provided to have a hexagonal shape.

7. The stud according to claim 1, wherein the flange is provided to have a circular shape.

* * * * *